No. 880,456. PATENTED FEB. 25, 1908.
J. C. JONES.
METHOD OF HEATING AND PURIFYING WATER.
APPLICATION FILED APR. 15, 1907.

2 SHEETS—SHEET 1.

WITNESSES
INVENTOR
BY
ATTORNEY

No. 880,456. PATENTED FEB. 25, 1908.
J. C. JONES.
METHOD OF HEATING AND PURIFYING WATER.
APPLICATION FILED APR. 15, 1907.

2 SHEETS—SHEET 2.

Witnesses: Inventor
Attorney

UNITED STATES PATENT OFFICE.

JOHN CLIFFORD JONES, OF WYNNEWOOD, PENNSYLVANIA, ASSIGNOR TO JOSEPH S. LOVERING WHARTON, WILLIAM S. HALLOWELL, AND JOHN C. JONES, OF PHILADELPHIA, PENNSYLVANIA, DOING BUSINESS UNDER THE FIRM NAME OF HARRISON SAFETY BOILER WORKS.

METHOD OF HEATING AND PURIFYING WATER.

No. 880,456.      Specification of Letters Patent.      Patented Feb. 25, 1908.

Application filed April 15, 1907. Serial No. 368,259.

*To all whom it may concern:*

Be it known that I, JOHN CLIFFORD JONES, a citizen of the United States, and resident of and whose post-office address is Wynnewood, in the county of Montgomery and State of Pennsylvania, have invented certain new and useful Improvements in Methods of Heating and Purifying Water, of which the following is a specification.

My invention relates to improvements in the methods of heating water, and improvements in feed water heaters, purifiers and regulators, and especially to those instances where the water of condensation is taken from the condenser and used over again.

The objects of my invention are, first, to provide economical, convenient and effective ways and means for reheating the condensed water and such supplemental raw water as may be necessary to make up the amount required.

I attain these objects by the ways and means illustrated and described in the following specification and drawings, in which like numerals of reference refer to like parts throughout the respective views.

Figure 1:
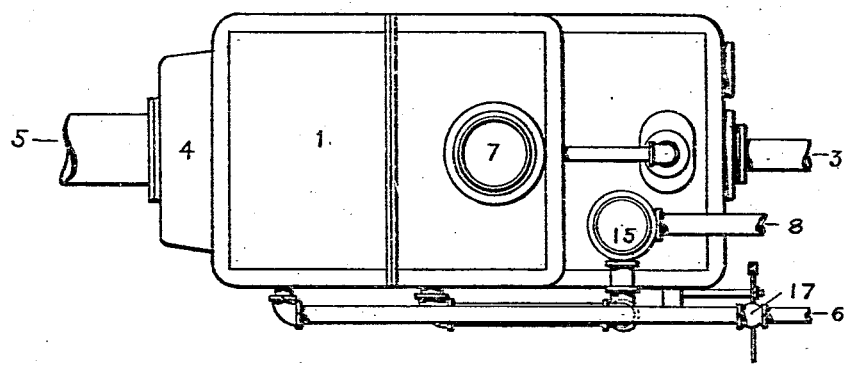
Figure 2:
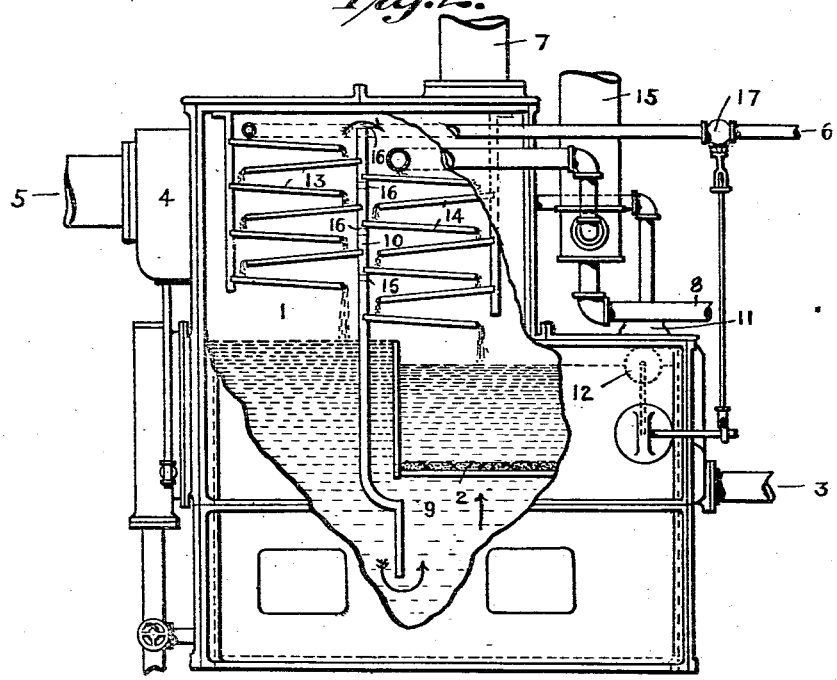
Figures 3, 4:
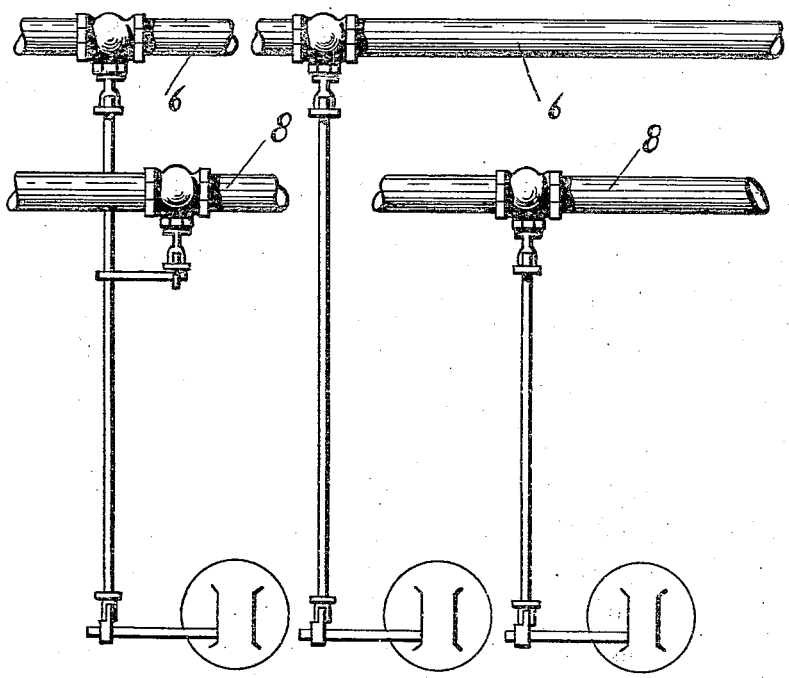

Figure 1 is a top plan view of a combined heater, purifier and filter embodying my invention. Fig. 2 is an elevation thereof, showing a portion of the casing broken away and the interior parts chiefly in section. Figs. 3 and 4 are detail views showing float controlled valves in both raw water and condensed water supplies.

Since the general structure of feed water heaters, etc., is well known in the art, I do not illustrate those features which are common in this device and which do not form a particular part of my improvement and which have already been described in various patents heretofore issued.

Referring in detail to Fig. 1,—1—is a heater; 2—a filter-bed; 3—an outlet passage; 4—separator; 5—steam inlet; 6—inlet for raw water; 7—exhaust to the atmosphere; 8 inlet for water coming from condensers, or other source, of partially heated water; 9—by-pass; 10—dividing partition; 11—dome of float chamber; 11'—vent pipe leading from float chamber to upper part of heater; 12—float and mechanism; 13—water trays on raw water side; 14—water trays on condensed water side; 15—stand pipe; 16—passages for steam in and around plate—10—; 17—valve in supply pipe.

Heretofore in most heating devices the exhaust steam from the motors or other source has been introduced into the heater in such way as to heat only the raw water which generally is at a comparatively low temperature and must be heated up to nearly the temperature of the steam—say, 210°. Owing to the impurity of this raw water, it should be filtered, and preferably chemically treated, for the purpose of precipitating and removing these impurities, all of which is old in the art and therefore will not be more at length explained.

My improvement while retaining all the advantages of this old system performs with it and combines with it in the same structure, a method of and means for utilizing the excess or surplus heat of the exhaust steam, for the purpose of heating the water of condensation, which may be taken from the condensers or from any other source, and which is substantially chemically and mechanically pure, and which is already at a high temperature and therefore requires comparatively little additional heat. It is, of course, an advantage to heat both these supplies and qualities of water at about the same time and by the same steam supply, and the operation of the device and method by which I accomplish this end is as follows: I construct the dividing partition —10— in a feed water heater in such a way as to substantially divide the same into two parts. Although this partition does not entirely cut off one part from the other, it is meant to separate the condensed water which enters at a comparatively high temperature at one side of the heater from the raw water entering at a comparatively low temperature at the other side while allowing the circulation of steam on each side. This particularly because, as has been said, the condensed water is already pure while the raw water has yet to be treated and purified. For this reason the partition has spaces about it or apertures in it through which the exhaust steam coming through —4— and —5— may pass after having warmed the water dripping from the raw water trays —13—, and thereupon heats the water dripping from the condensed water trays —14— on the other side of the partition. This dripping, disintegrating or spraying effects a more rapid and effectual heating of both raw and condensed water supplies. I prefer to introduce this steam in the first place at that side of the heater to which the raw water is first introduced, since it is desirable that the coldest water should receive the first heat of the incoming steam, since the pure water from the condensers is already very hot and therefore requires a smaller increment of heat from the steam in the heater, which increment is sufficiently found in the steam after it has heated the raw water.

Since the condensed water is already purified it need not be filtered and may pass directly to the outlet or pump supply —3—. On the other hand, the raw water, after having been chemically treated and heated, must yet be filtered, and in the figure the arrows show the circulation of the water up through the filter into the compartment containing the already condensed water with which it mixes, and where it is—at practically the same temperature—taken off by the pumps.

As has been pointed out, the arrangement is such that the condensed water is heated in one compartment and the make-up water in another, but before reaching the pump supply line the two waters are merged, and after merging maintain the desired working water line within the float chamber.

In some cases it may be found desirable to use two floats—one controlling a valve in raw water supply pipe and the other controlling a valve in the condensed water supply pipe, or one float may control both valves and these should be controlled from the common water line level after the two supplies are combined. As usually operated, and as I have illustrated it, the float should control the operation of the valve supplying the raw water to the system, because the water from the surface condenser is in practically all cases insufficient for the requirements of the boiler feed, and consequently raw, make-up water has to be added, and it is to measure out accurately this make-up or supplementary supply that the float and valve are employed.

The water from the condenser discharge enters a stand pipe, thence through a water seal connection to one division of the system, while the make-up water passes through another connection to the other division.

In order to insure that there shall be sufficient quantity for the pump supply at all times, irrespective of the condition of the filter-bed, and in the case that the amount of pure water of condensation is not sufficient for the demand, I provide a by-pass —9— extending from the raw water side of the heater about the filter-bed and discharging into the pure water side. This by-pass is adapted to operate only when the filter-bed has become so clogged that not sufficient water will pass through it to supplement sufficiently the pure heated water of condensation.

Where I have used the word "dripping" I mean a dividing up, disintegrating, spraying or breaking up of the supplied water into particles or minute streams.

I have shown one of the simplest forms of by-passes, since the particular form is not claimed by me in this application.

It will be understood that in thus explicitly describing the apparatus by which my method may be carried out, I do so merely to show a tangible means for carrying out this method—the method being my invention as embodied in this application, while the peculiar apparatus for performing this method forms the subject matter of an application filed by me July 8, 1907, bearing Serial No. 382,611.

I do not limit myself to any particular form, proportion, arrangement, construction, material, design or size in my invention, but What I do claim and desire to protect by Letters Patent is—

1. The method of heating and supplying feed water which consists in introducing steam to a supply of raw water, thereafter bringing the steam in contact with finely divided water of condensation, purifying the raw water and bringing the water from both sources into the same outlet and thereafter uniting the two supplies.

2. The method of heating feed water, which consists in introducing steam to a supply of raw water, thereafter bringing the steam in contact with finely divided and disintegrated water of condensation.

3. The method of heating, purifying and supplying feed water which consists in bringing steam into contact with finely divided and disintegrated cold raw and hot condensed water successively; purifying the raw water and mixing the water from both sources.

4. The method of heating feed water which consists in successively submitting separate supplies of raw and condensed water in broken and divided particles to a current of steam.

5. The method of heating feed water which consists in introducing a current of steam to a supply of sprayed cold raw water and a separate supply of sprayed warm condensed water.

6. The method of heating and supplying feed water, which consists in permeating a supply of sprayed raw water with live steam, then introducing said steam in a plurality of separate streams to a supply of sprayed water of condensation; purifying the raw water and bringing the water from both sources into a common outlet.

7. The method of heating and supplying feed water, which consists in diffusing steam through a supply of broken and divided particles of raw water, then introducing said steam to and diffusing the same through a supply of broken and divided particles of condensed water, then mixing the water from both sources and feeding it through a common outlet.

8. The method of heating and supplying a quantity of feed water, which consists in supplying a uniform and controlled quantity of both raw and condensed water and progressively breaking it up in broken and divided particles, then introducing steam to and progressively diffusing the same through the raw and condensed water successively, then mixing the water from both sources and feeding it through a common outlet.

Signed at Philadelphia in the county of Philadelphia and State of Pennsylvania this first day of April A. D. 1907.

JOHN CLIFFORD JONES.

Witnesses:
THOMAS G. PROSSER,
S. HORACE MYERS.